United States Patent
Fujita

(10) Patent No.: US 10,355,320 B2
(45) Date of Patent: Jul. 16, 2019

(54) POWER STORAGE DEVICE FOR A BATTERY GROUP AND CONNECTION CONTROL OF CAPACITOR AND SWITCHING DEVICE

(71) Applicant: Nissan Motor Co., Ltd., Yokohama-shi, Kanagawa (JP)

(72) Inventor: Takeshi Fujita, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 90 days.

(21) Appl. No.: 15/575,130

(22) PCT Filed: May 18, 2015

(86) PCT No.: PCT/JP2015/064184
§ 371 (c)(1),
(2) Date: Nov. 17, 2017

(87) PCT Pub. No.: WO2016/185536
PCT Pub. Date: Nov. 24, 2016

(65) Prior Publication Data
US 2018/0145378 A1    May 24, 2018

(51) Int. Cl.
| | | |
|---|---|---|
| H01M 2/34 | (2006.01) | |
| H02J 7/00 | (2006.01) | |
| H02J 7/02 | (2016.01) | |
| H02J 7/34 | (2006.01) | |
| H01M 10/42 | (2006.01) | |

(Continued)

(52) U.S. Cl.
CPC .......... *H01M 10/441* (2013.01); *H01M 2/34* (2013.01); *H01M 10/482* (2013.01); *H02J 7/007* (2013.01); *H02J 7/0016* (2013.01); *H02J 7/0024* (2013.01); *H02J 7/02* (2013.01); *H02J 7/34* (2013.01); *B60L 2210/30* (2013.01); *H01M 10/443* (2013.01); *H01M 2010/4271* (2013.01)

(58) Field of Classification Search
CPC .... H01M 10/441; H01M 2/34; H01M 10/482; H01M 2010/4271; H01M 10/443; H02J 7/34; H02J 7/007; H02J 7/0016; H02J 7/0024; H02J 7/02; B60L 2210/30
See application file for complete search history.

(56) References Cited

U.S. PATENT DOCUMENTS

| | | | |
|---|---|---|---|
| 2013/0063091 A1* | 3/2013 | Nishi | H02J 7/0016 320/126 |
| 2013/0300192 A1* | 11/2013 | Inaba | H01M 10/482 307/9.1 |
| 2015/0364797 A1* | 12/2015 | Inaba | H02J 7/0024 429/61 |

FOREIGN PATENT DOCUMENTS

| | | |
|---|---|---|
| EP | 2670018 A1 | 12/2013 |
| JP | 2010028886 A | 2/2010 |

(Continued)

*Primary Examiner* — Drew A Dunn
*Assistant Examiner* — Sailesh Thapa
(74) *Attorney, Agent, or Firm* — Young Basile Hanlon & MacFarlane, P.C.

(57) ABSTRACT

The power storage device includes a battery group in which n series circuits C1 (wherein n represents an integer of 2 or greater) are connected in parallel and a battery controller controlling a switching device based on allowable charge/discharge power of the capacitor. The series circuit C1 includes a capacitor and the switching device which are connected in parallel. The battery controller controls the switching device to maximize the allowable charge/discharge power of the battery group.

4 Claims, 2 Drawing Sheets

(51) Int. Cl.
*H01M 10/44* (2006.01)
*H01M 10/48* (2006.01)

(56) References Cited

FOREIGN PATENT DOCUMENTS

JP 2015006027 A 1/2015
WO 2012101771 A1 8/2012

* cited by examiner

POWER STORAGE DEVICE FOR A BATTERY GROUP AND CONNECTION CONTROL OF CAPACITOR AND SWITCHING DEVICE

TECHNICAL FIELD

The present invention relates to a power storage apparatus and connection control method.

BACKGROUND

Regarding a power storage system provided with a plurality of power storage devices connected in parallel, when allowable charge/discharge power of each power storage device varies, a prior art for controlling each power storage device independently to efficiently control charge/discharge control for a plurality of power storage devices has been known (for example, see JP 2010-28886 A).

In the above technique, a value determined by multiplying the number of capacitors by the smallest value among the allowable charge/discharge power values of the power storage devices provided with the power storage system is used as the allowable charge/discharge power of the entire power storage system. For this reason, there is a problem that the charge/discharge power of the power storage device included in the power storage system cannot be efficiently used.

SUMMARY

Problems to be solved by the present invention include providing a power storage apparatus capable of efficiently using charge/discharge power of a capacitor.

The present invention solves the above problem by controlling switching device by a battery controller controlling the switching device connected to a capacitor in a series circuit to maximize the allowable charge/discharge power of a battery group formed by connecting n series circuits (wherein n represents an integer of 2 or greater) in parallel.

According to the present invention, the battery controller controls the switching device to maximize the allowable charge/discharge power of the battery group the maximum. Therefore, the charge/discharge power of the capacitor provided with the power storage device can be efficiently used.

DETAILED DESCRIPTION OF THE DRAWINGS

DETAILED DESCRIPTION OF THE EMBODIMENTS

Modes for Carrying Out the Invention

In the following, embodiment of the present invention is described with reference to the drawings.

Figure 1:
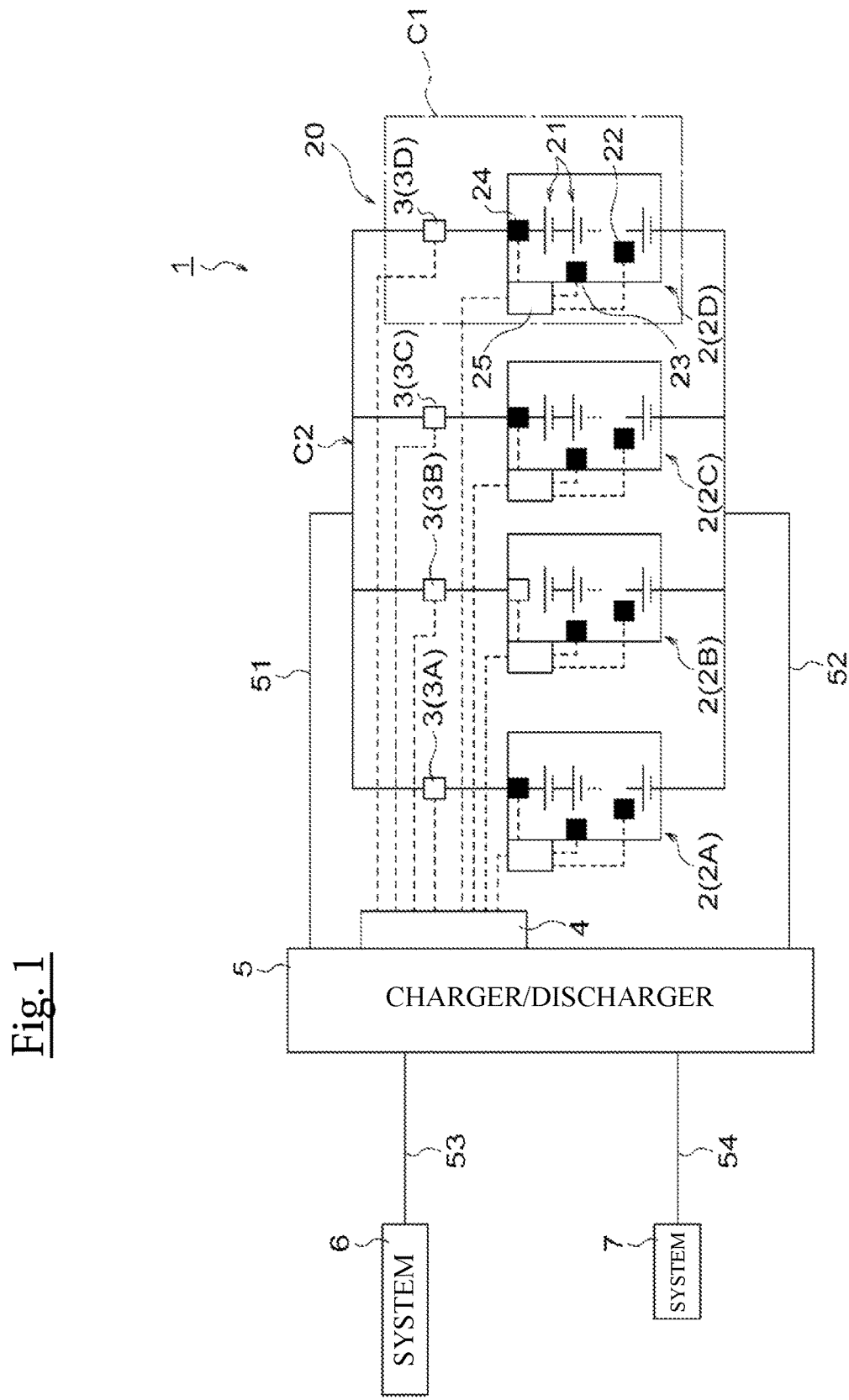
FIG. 1 is a figure illustrating an entire power storage device according to an embodiment of the present invention.

FIG. 1 is a figure illustrating the entire power storage device according to the present embodiment.

As shown in FIG. 1, the power storage device 1 of the present embodiment includes n capacitors 2, a switching device 3, a battery controller 4, and a charger/discharger 5. Here, the n represents an integer of 2 or greater, and is 4 in the present example.

The capacitor 2 includes a plurality of power storage cells 21 connected in series, a cell voltage detector 22, a capacitor temperature detector 23, a current detector 24, and a capacitor controller 25. The power storage device 1 in the present embodiment includes a total of four capacitors 2. However, the number of capacitors 2 included in the power storage device 1 is not particularly limited as long as two or more capacitors are included. In the following explanation, each of the four capacitors 2 may be also called as a capacitor 2A, capacitor 2B, capacitor 2C, and capacitor 2D in the order from the left of FIG. 1.

As a specific structure of the power storage cell 21, a lithium ion secondary battery, a nickel-hydrogen secondary battery, or the like may be used. Here, the number of the power storage cells 21 constituting the capacitor 2 is not particularly limited. For example, the capacitor 2 may be formed by one power storage cell 21. More, although all of the power storage cells 21 are connected in series in the present embodiment, the connection method of the power storage cells 21 constituting the capacitor 2 is not particularly limited. For example, a part of the power storage cells 21 may be connected in parallel.

The cell voltage detector 22 includes a function for detecting voltage of the power storage cell 21. Further, the number of cell voltage detectors 22 attached to the capacitor 2 is not particularly limited. For example, the cell voltage detector 22 may be attached to each of the power storage cells 21 included in the capacitor 2. The cell voltage detector 22 sends the detection result to the capacitor controller 25.

The capacitor temperature detector 23 includes a function for detecting temperature of the capacitor 2. The number of capacitor temperature detectors 23 attached to the capacitor 2 is not particularly limited. The capacitor temperature detector 23 sends detection result to the capacitor controller 25.

The current detector 24 includes a function for detecting current that flows into a terminal of the capacitor 2 and sends the detected result to the capacitor controller 25.

The capacitor controller 25 includes a function for sending voltage of the power storage cell 21 and total voltage of the capacitor 2 detected by the cell voltage detector 22, temperature of the capacitor 2 detected by the capacitor temperature detector 23, and current detected by the current detector 24 to the battery controller 4.

The switching device 3 is connected to the capacitor 2 as series circuit C1 as shown in FIG. 1, and includes a function for switching ON and OFF of the connection based on a command from the battery controller 4. In the present embodiment, by individually connecting one switching device 3 in series to one capacitor 2, n series circuits C1 are formed (wherein the n is 4 in present example). These series circuits C1 are connected in parallel and form a battery group 20, a parallel circuit C2, and also the parallel circuit C2 is connected to a charger/discharger 5. The switching device 3 in the present embodiment corresponds to an example of switching device of the present invention.

Further, in the following explanation each of the four switching devices 3 may be also called as "switching device 3A" for the one connected in series to the capacitor 2A, "switching device 3B" for the one connected in series to the capacitor 2B, "switching device 3C" for the one connected in series to the capacitor 2C, and "switching device 3D" for the one connected in series to the capacitor 2D.

The battery controller 4 includes a computer or the like provided with a CPU, ROM, and a computer including RAM. The battery controller 4 calculates a state of charge (SOC) of the capacitor 2 based on information (voltage of the power storage cell 21, total voltage of the capacitor 2, temperature of the power storage cell 21, and current that flows into a terminal of the capacitor 2) sent from the capacitor controller 25, and detects allowable charging power and allowable discharge power of the capacitor 2. For a method of calculating an SOC, various methods known to the public may be used, and for example, a publicly-known method such as detecting an SOC from open circuit voltage of the capacitor 2, or detecting an SOC from an integrated value of the current input and output to and from the terminal of the capacitor 2 may be applied. More, the battery controller 4 includes a function for controlling a switching device 3 based on the allowable charging power and allowable discharge power of the capacitor 2.

Note that the allowable charging power of the capacitor 2 indicates an upper limit value of electric power chargeable to the capacitor 2 and can be set as a power value for preventing overcharge that occurs when the SOC of the capacitor 2 becomes high and deterioration of the capacitor 2. More, the allowable discharge power of the capacitor 2 indicates an upper limit value dischargeable by the capacitor 2 and can be set as a power value for preventing overdischarge that occurs when the SOC of the capacitor 2 becomes low and deterioration of capacitor 2. Generally, the allowable charging power is also called as inputtable power or maximum charge power, however, is called as allowable charging power in the present embodiment. Also, the allowable discharge power is also called as outputtable power or maximum discharge power in general. However, in the present embodiment, the allowable discharge power is called as allowable discharge power. More, a method for setting the allowable charging power and allowable discharge power is not particularly limited to the above. In the following, the allowable charging power and allowable discharge power may be also integrally called as allowable charge/discharge power. The control performed by the battery controller 4 is described later.

The charger/discharger 5 includes a function for converting AC power to DC power or DC power to AC power, and is connected to the switching device 3 via a cable 51 and also connected to the negative electrode side of the capacitor 2 via a cable 52. More, the charger/discharger 5 is connected to a system 6 via a cable 53 and also to a load 7 via a cable 54. In this way, the DC power of the capacitor 2 is converted to the AC power and the electric power is supplied to the load 7. Also, the AC power supplied from the system 6 is converted to the DC power and supplied to the capacitor 2.

The system 6 includes an electric device such as an external power supply or the like for supplying AC power. The electric power supplied from the system 6 is sent to the battery controller 4. The system 6 may be a device to supply DC power and in such case, AC/DC conversion of the electric power by the charger/discharger 5 can be omitted.

The load 7 includes such as household electric appliances or the like consuming AC power like an air conditioner and lightning, etc. The electric power and current value requested by the load 7 and electric power applicable to the load 7 are sent to the battery controller 4. More, the load 7 may be a device or the like that consumes DC power, and in such case, AC/DC conversion of the electric power by the charger/discharger 5 can be omitted.

Figure 2:
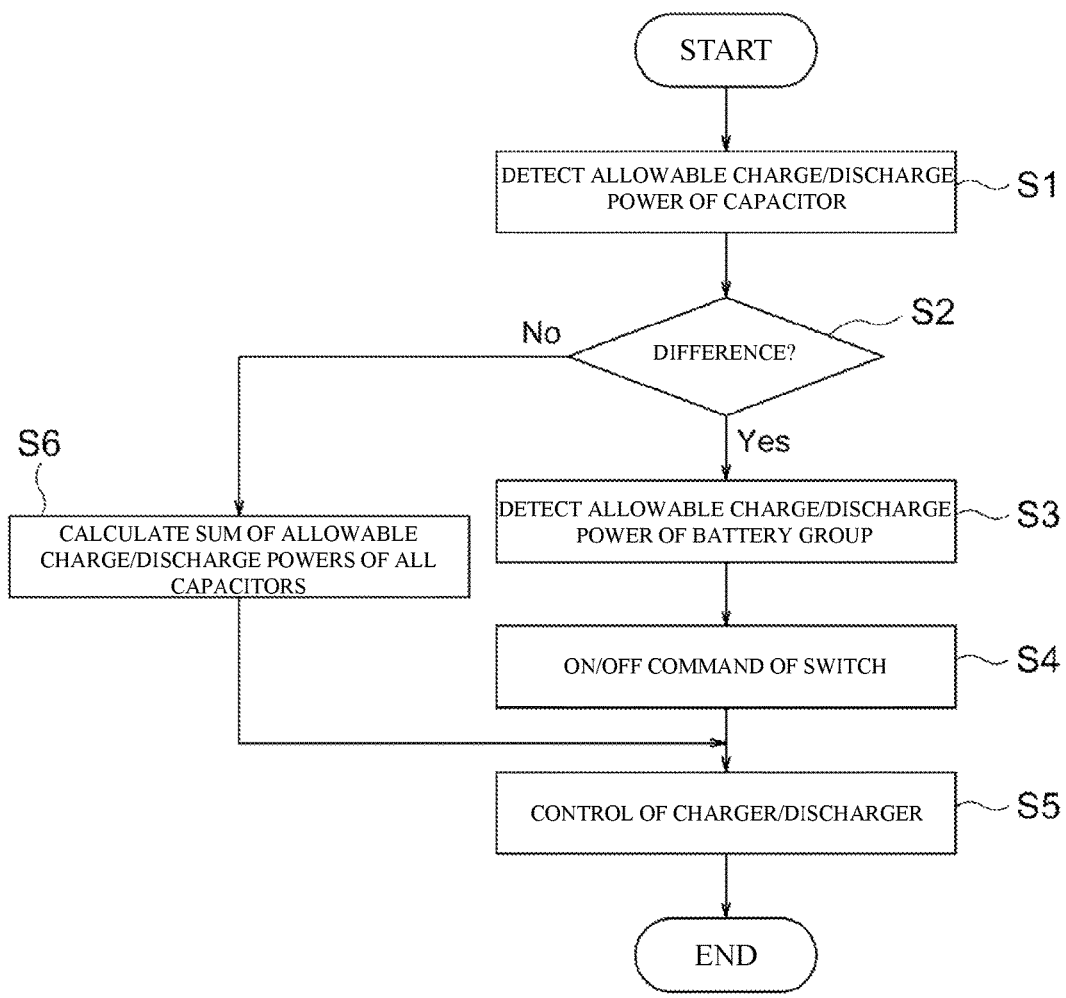
FIG. 2 is a flowchart illustrating control performed by a battery controller according to an embodiment of the present invention.

Next, a control flow by the battery controller 4 of the present embodiment will be described. FIG. 2 is a flowchart indicating control performed by the battery controller 4 all times or in a certain time interval.

First in Step S1, the battery controller 4 calculates an SOC for each of the capacitors 2A to 2D based on the information (voltage of the power storage cell 21 total voltage of the capacitor 2, temperature of the power storage cell 21, and current that flows into the terminal of the capacitor 2) sent from the capacitor controller 25, and detects allowable charge/discharge power for each of the capacitors 2A to 2D.

Next, in Step S2, whether or not there is a difference between allowable charge/discharge powers of the capacitors 2A to 2D detected in Step S1 is determined. Such determination is made, for example, by checking whether or not a difference between the maximum value and minimum value of the charge/discharge power of the capacitors 2A to 2D exceeds a predetermined threshold value set in advance. When there is a difference between the allowable charge/discharge powers of the capacitors 2A to 2D ("Yes" in Step S2), the process proceeds to Step S3.

In Step S3, the battery controller 4 detects a combination of the capacitors 2 where the allowable charge/discharge power of the entire battery group 20 becomes the maximum. When the electric power supplied from the system 6 is charged to the capacitor 2, the battery controller 4 detects a combination of the capacitors 2 where the allowable charging power of the entire battery group 20 becomes the maximum. When electric power is supplied to the load 7 from the capacitor 2, the battery controller 4 detects a combination of the capacitors 2 where the allowable discharge power of the entire battery group 20 becomes the maximum.

In the following explanation, a case of detecting the allowable charging power of the battery group 20 when charging electric power supplied from the system 6 to the capacitor 2 is described. However, similar detection method is also used for a case where allowable discharge power of the battery group 20 is detected when the electric power from the capacitor 2 is supplied to the load 7. In other words, for the case of detecting discharge power of the battery group 20 when supplying the electric power from the capacitor 2 to the load 7, replace "allowable charging power" in the following explanation with "allowable discharge power" before application.

When charging electric power supplied from the system 6 to the capacitor 2, first, the allowable charging power for each of the capacitors 2A to 2D is detected. For convenience of explanation, the values of the allowable charging power of the capacitors 2A to 2D are represented as $W_1$ to $W_4$.

Next, an F value is calculated based on the following formula (1).

$$F = M \times W_{min\ (k)} \quad (1)$$

In the above formula (1), k represents an integer of 1 or greater and n or smaller, and $W_{min\ (k)}$ is allowable charging power smallest in the k-th place among the allowable charging powers of the n capacitors 2 (n=4 in the present example), and M is the number of capacitors 2 having the allowable charging power of $W_{min\ (k)}$ or greater.

In other words, first, the minimum value $W_{min\ (1)}$ among the allowable charging powers $W_1$ to $W_4$ of the capacitors 2A to 2D is detected. Then, since there are four (M=4) capacitors 2 having the allowable charging power of the smallest value $W_{min\ (1)}$ or greater in the present example, an F value is calculated by $4 \times W_{min\ (1)}$. Next, the F value is calculated by determining a value by multiplying M, the number of capacitors 2 having the allowable charging power of allowable charging power $W_{min\ (2)}$ smallest in the second place or greater by the allowable charging power $W_{min\ (2)}$. Similarly, the F value is also calculated for the allowable charging power $W_{min\ (3)}$, which is smallest in the third place, and for allowable charging power $W_{min\ (4)}$, which is smallest in the fourth place.

Specifically, for example, when each of the allowable charging powers $W_1$ to $W_4$ of the capacitors 2A to 2D is $W_1=20$ kW (a value smallest in the first place ($W_{min\ (1)}$)), $W_2=30$ kW (a value smallest in the second place ($W_{min\ (2)}$)), $W_3=40$ kW (a value smallest in the third place ($W_{min\ (3)}$)), and $W_4=50$ kW (a value smallest in the fourth place ($W_{min\ (4)}$)) respectively (hereafter, also called as Example 1), four values 80 ($=4 \times W_{min\ (1)}=4 \times 20$) kW, 90 ($=3 \times W_{min\ (2)}=3 \times 30$) kW, 80 ($=2 \times W_{min\ (3)}=2 \times 40$) kW, and 50 ($=1 \times W_{min\ (4)}=1 \times 50$) kW are obtained as the F values.

Further, for example, when each of the allowable charging powers $W_1$ to $W_4$ of the capacitors 2A to 2D is $W_1=20$ kW (a value smallest in the first place ($W_{min\ (1)}$)), $W_2=30$ kW (a value smallest in the second place ($W_{min\ (2)}$)), $W_3=30$ kW (a value smallest in the second place ($W_{min\ (2)}$)), and $W_4=90$ kW (a value smallest in the third place ($W_{min\ (3)}$)) respectively (hereafter, also called as Example 2), three values 80 ($=4 \times W_{min\ (1)}=4 \times 20$) kW, 90 ($=3 \times W_{min\ (2)}=3 \times 30$) kW, and 90 ($=1 \times W_{min\ (3)}=1 \times 90$) kW are obtained as the F values.

Next, the maximum value $F_{max}$ among the obtained F values is determined. In Example 1 above, the maximum value $F_{max}$ of the F value is 90 ($=3 \times W_{min\ (2)}$) kW, and also in Example 2 above, the maximum value $F_{max}$ of the F value is 90 ($=3 \times W_{min\ (2)}$, $=1 \times W_{min\ (3)}$) kW.

Then, a combination of the capacitors 2 where the allowable charging power is $W_{min\ (k')}$ or greater among the four capacitors 2 is set as the combination of the capacitors 2 where the charge power of the entire battery group 20 becomes the maximum. More, k' in this case is the k value that provides the maximum value $F_{max}$ of the F value.

In the case of Example 1, the k value (=k') providing 90 ($=3 \times W_{min\ (2)}$) kW, which is the maximum value $F_{max}$ of the F value, is 2, and the capacitors 2B to 2D having the allowable charging power of $W_{min\ (k')}$ ($=W_{min\ (2)}=30$ kW) or greater are set as a combination of the capacitors 2 where the charge power of the entire battery group 20 becomes the maximum.

In the case of Example 2, the k value (=k') providing 90 kW, which is the maximum value $F_{max}$ of the F value, is 2 and 3, and from $W_{min\ (k')}=W_{min\ (2)}=30$ kW and $W_{min\ (k')}=W_{min\ (3)}=90$ kW, two $W_{min(k')}$ can be obtained. As can be seen, when a plurality of $W_{min\ (k')}$ exists, a combination of the capacitors 2 having the allowable charging power of the smallest $W_{min\ (k')}$ or greater is adopted. In the present example, $W_{min\ (2)}$ is smaller than $W_{min\ (3)}$ ($W_{min\ (2)}<W_{min\ (3)}$). For this reason, the capacitors 2B to 2D having the allowable charging power of the smallest $W_{min\ (k')}$, $W_{min\ (2)}$ (=30 kW) or greater, are set as the combination of the capacitors 2 to maximize the charge power of the entire battery group 20.

Following the above, in Step S4, the switching device 3 connected to the capacitors 2 that correspond to the combination set in Step S3 is set to ON and also the switching device 3 connected to the capacitor 2 that does not correspond to the combination is set to OFF.

In the case of Example 1, the switching devices 3B to 3D connected to the capacitors 2B to 2D are set to ON and also the switching device 3A connected to the capacitor 2A is set to OFF. Also, for the case of Example 2, the switching devices 3B to 3D connected to the capacitors 2B to 2D are set to ON and the switching device 3A connected to the capacitor 2A is set to OFF.

Next, in Step S5, the electric power equivalent to the maximum $F_{max}$ of the F value, is supplied from the system 6 to the capacitor 2. In the case of Example 1 above, electric power of 90 kW is supplied to three capacitors 2B to 2D from the system 6. Similarly, for the case of Example 2, the electric power of 90 kW is supplied from the system 6 to three capacitors 2B to 2D. When supply of the electric power to the capacitors 2 finishes, control of the battery controller 4 ends.

In Step S2, when there are no differences between the allowable charge/discharge powers of the capacitors 2A to 2D ("No" in Step S2), the process proceeds to Step S6. In step S6, the battery controller 4 calculates the sum of the allowable charge powers of all capacitors 2A to 2D, and at the same time sets all of the switching devices 3A to 3D to ON. Then, for all capacitors 2A to 2D, the electric power equivalent to the sum is supplied from the system 6 (Step S5). When supply of the electric power to the capacitors 2 finishes, control of the battery controller 4 ends.

In the following, an effect of the capacitor in the present embodiment is described.

In the present embodiment, when charging the capacitor 2, the battery controller 4 detects the combination of the capacitors 2 where the allowable charging power of the entire battery group 20 becomes the maximum and controls the switching device 3. For this reason, charge power of the capacitor 2 included in the power storage device 1 can be efficiently used.

More, at the point, the battery controller 4 performs control to set the switching device 3 connected to the capacitor 2 having the allowable charging power of (k') or greater among the n capacitors 2 (n=4 in the present example) to ON so that the allowable charging power of the entire battery group 20 becomes the maximum value $F_{max}$ of a value F represented by the above formula (1) (see Step S3). In this way, while charging with the electric power of the allowable charging power or below of each capacitor 2, the entire charge amount of the battery group 20 per unit time can be maximized. Accordingly, the charge power of the capacitor 2 can be efficiently used even further.

Additionally, the battery controller 4 switches the switching device 3 that corresponds to the capacitor 2 having the allowable charging power of the smallest $W_{min\ (k')}$ or greater to ON when there is a plurality of k values (=k') that provides the maximum value of F in the above formula (1) (see Example 2 above). In such case, since the number of capacitors 2 used during charging can be made to the maximum, the load due to charging of each capacitor 2 can be suppressed to the minimum.

Further, in the present embodiment, only one charger/discharger 5 is used for the n capacitors 2 (n=4 in the present example) and there is no need to arrange one charger/discharger per one capacitor 2. Accordingly, the increase in size of the entire power storage device 1 can be suppressed.

The effects described above can be similarly obtained for a case where discharge power of the battery group 20 when the electric power is supplied from the capacitor 2 to the load 7 is detected. In other words, when discharge of the capacitor 2 is to be performed, as the battery controller 4 detects a combination of the capacitors 2 where the allowable discharge power of the entire battery group 20 becomes the maximum and controls the switching device 3, discharge power of the capacitors 2 included in the power storage device 1 can be efficiently used.

Further, when doing this, the battery controller 4 performs control to set the switching device 3 connected to the capacitor 2 having the allowable discharge power of (k') or greater from the n capacitors (n=4 in the present example) to ON so that the allowable discharge power of the entire battery group 20 becomes the maximum value $F_{max}$ of the value F represented by the above formula (1). In this way, while performing discharge with electric power below the allowable discharge power of each capacitor 2, the discharge amount of the entire battery group 20 per unit time can be maximized. Accordingly, the discharge power of the capacitor 2 can be efficiently utilized even further.

Furthermore, when a plurality of k values (=k') that provides the maximum value for the F value in the above formula (1) exist, the battery controller 4 sets the switching device 3 that corresponds to the capacitor 2 having the minimum allowable discharge power of $W_{min\ (k')}$ or greater to ON. In such case, since the number of capacitors 2 used during discharge can be maximized, the load to each capacitor 2 due to discharge can be suppressed to the minimum.

Additionally, the above embodiment is descried to make understanding of the present invention easy and not intended to limit the present invention. Accordingly, each element disclosed in the above embodiment is intended to include any design change or equivalents that belong to the same technical scope of the present invention.

For example, in Step S3 described above, when a capacitor 2 having the allowable charge/discharge power of less than a predetermined value (for example, 0 kW) is included in the n capacitors 2, calculation of the above formula (1) may be performed only for the capacitors 2 other than the capacitor 2 having the allowable charge/discharge power of less than the predetermined value. In this case, load to the processing performed by the battery controller 4 can be reduced.

DESCRIPTION OF REFERENCE NUMERALS

1 . . . Power storage device
2, 2A to 2D . . . Capacitor
20 . . . Battery group
21 . . . Power storage cell
22 . . . Cell voltage detector
23 . . . Capacitor temperature detector
24 . . . Current detector
25 . . . Capacitor controller
3, 3A to 3D . . . Switching device
4 . . . Battery controller
5 . . . Charger/discharger
6 . . . System
7 . . . Load
C1 . . . Series circuit
C2 . . . Parallel circuit

The invention claimed is:

1. A power storage apparatus comprising:
a battery group connecting n series circuits in parallel, wherein n represents an integer of 2 or greater, the series circuit connecting a capacitor and a switching device; and
a battery controller for controlling the switching device based on allowable charge/discharge power of the capacitor,
wherein the battery controller detects a combination of the capacitors where allowable charge/discharge power of the entire battery group becomes the maximum, switches the switching device which corresponds to the combination to ON, and switches the switching device which does not correspond to the combination to OFF,
the battery controller performs switching control so that the allowable charge/discharge power of the battery group becomes the maximum value ($F_{max}$) of a value (F) represented by the following (1), and
the switching control is controlled to set the switching device connected to the capacitor having the allowable charge/discharge power of $W_{min\ (k')}$ or greater to ON among the n capacitors, $$F = M * W_{min\ (k)} \qquad (1)$$

wherein k represents an integer of 1 or greater and the n or smaller, k' is the k that provides the maximum value ($F_{max}$), $W_{min\ (k)}$ is the allowable charge/discharge power smallest in the k-th place among the allowable charge/discharge power of the n capacitors, and M represents the number of the capacitors having the allowable charge/discharge power of the $W_{min\ (k)}$ or greater.

2. The power storage apparatus according to claim 1, wherein the switching control is control for switching the switching device which corresponds to the capacitor having the allowable charge/discharge power of the minimum ($W_{min\ (k')}$) or greater to ON when a plurality of the k' exists.

3. The power storage apparatus according to claim 1, wherein
the allowable charge/discharge power of the battery group indicates an upper limit value of charge/discharge power for preventing overcharge/overdischarge.

4. A connection control method for connecting electrically at least two of capacitors included in the battery group in parallel, in a battery group connecting n series circuits in parallel, wherein n represents an integer of 2 or greater, the series circuit connecting a capacitor and a switching device, the method comprising of:
detecting a combination of the capacitor where allowable charge/discharge power of the entire battery group becomes the maximum;
switching the switching device which corresponds to the combination to ON;
switching the switching device which does not correspond to the combination to OFF; and
connecting electrically the capacitor having allowable charge/discharge power of $W_{min\ (k')}$ or greater among n capacitors so that the allowable charge/discharge power of the battery group becomes the maximum value ($F_{max}$) of a value (F) represented by the following (2), $$F = M * W_{min\ (k)} \qquad (2)$$

wherein k represents an integer of 1 or greater and the n or smaller, k' is the k that provides the maximum value ($F_{max}$), $W_{min\ (k)}$ is the allowable charge/discharge power smallest in the k-th place among the allowable charge/discharge power of the n capacitors, and M represents the number of the capacitors having the allowable charge/discharge power of the $W_{min\ (k)}$ or greater.

* * * * *